United States Patent [19]
Gill et al.

[11] Patent Number: 5,135,171
[45] Date of Patent: Aug. 4, 1992

[54] CONTAINER FOR A LIQUID FOR ATTACHMENT TO EQUIPMENT FOR DELIVERING THE LIQUID

[75] Inventors: David C. Gill, Bristol; Eren Ali, London, both of United Kingdom

[73] Assignee: Nomix-Chipman Limited, United Kingdom

[21] Appl. No.: 513,788

[22] Filed: Apr. 24, 1990

Related U.S. Application Data

[63] Continuation-in-part of Ser. No. 221,284, Jul. 19, 1988, Pat. No. 4,976,465.

[30] Foreign Application Priority Data

Jul. 20, 1987 [GB] United Kingdom ............... 8717048
Apr. 20, 1988 [GB] United Kingdom ............ 8809307.5

[51] Int. Cl.⁵ .......................................... B05B 3/10
[52] U.S. Cl. ............................. 239/224; 227/325; 227/386.5
[58] Field of Search ............ 222/175, 325, 386.5, 222/183, 153, 130, 131, 105; 239/302, 223, 224

[56] References Cited

U.S. PATENT DOCUMENTS

| | | | |
|---|---|---|---|
| 1,006,217 | 10/1911 | Honour | 222/131 |
| 2,321,836 | 6/1943 | Marzo | 222/386.5 |
| 2,673,007 | 3/1954 | Derbie | 222/183 X |
| 3,158,296 | 11/1964 | Cornelius | 222/386.5 |
| 3,902,638 | 9/1975 | Gillespie | 222/386.5 |
| 3,970,121 | 7/1976 | Brandt . | |
| 4,437,590 | 3/1984 | LaBruna | 222/386.5 |
| 4,645,128 | 2/1987 | Graber | 239/223 |
| 4,788,086 | 10/1988 | Shibata et al. | 222/325 |
| 4,790,483 | 12/1988 | Gill | 239/224 |

FOREIGN PATENT DOCUMENTS

| | | |
|---|---|---|
| 68718 | 1/1983 | European Pat. Off. . |
| 3517122 | 5/1986 | Fed. Rep. of Germany . |
| 3535986 | 4/1987 | Fed. Rep. of Germany . |
| WO8203799 | 11/1982 | PCT Int'l Appl. . |
| 1586437 | of 1881 | United Kingdom . |
| 857786 | 1/1961 | United Kingdom . |
| 897286 | 5/1962 | United Kingdom . |
| 1075221 | 7/1967 | United Kingdom . |
| 1076887 | 7/1967 | United Kingdom . |
| 1173272 | 12/1969 | United Kingdom . |
| 1410304 | 10/1975 | United Kingdom . |
| 1434967 | 5/1976 | United Kingdom . |
| 1472178 | 5/1977 | United Kingdom . |
| 2001934 | 2/1979 | United Kingdom . |
| 2013462 | 8/1979 | United Kingdom . |
| 211939 | 7/1983 | United Kingdom . |
| 2130873 | 6/1984 | United Kingdom . |
| 2131327 | 6/1984 | United Kingdom . |
| 2163632 | 3/1986 | United Kingdom . |
| 2171383 | 8/1986 | United Kingdom . |
| 2197094 | 5/1988 | United Kingdom . |

*Primary Examiner*—Kevin P. Shaver
*Attorney, Agent, or Firm*—Merchant, Gould, Smith, Edell, Welter & Schmidt

[57] ABSTRACT

A container for liquid such as herbicide has a internal flexible partition dividing the interior of the container into two compartments, one of which is liquid filled and communicates with an outlet, while the other communicates with the surroundings through a vent hole. The wall of the container has recesses for engagement by latching elements of delivery equipment to retain the container with respect to the delivery equipment.

12 Claims, 3 Drawing Sheets

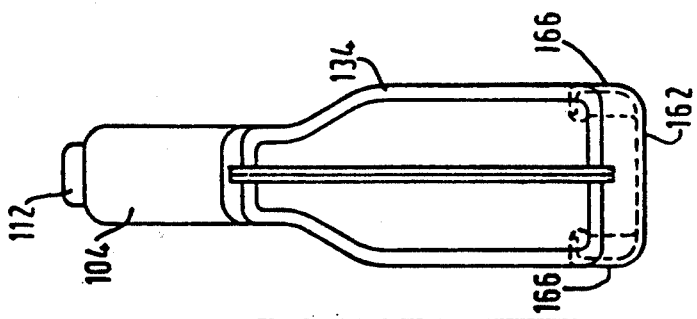
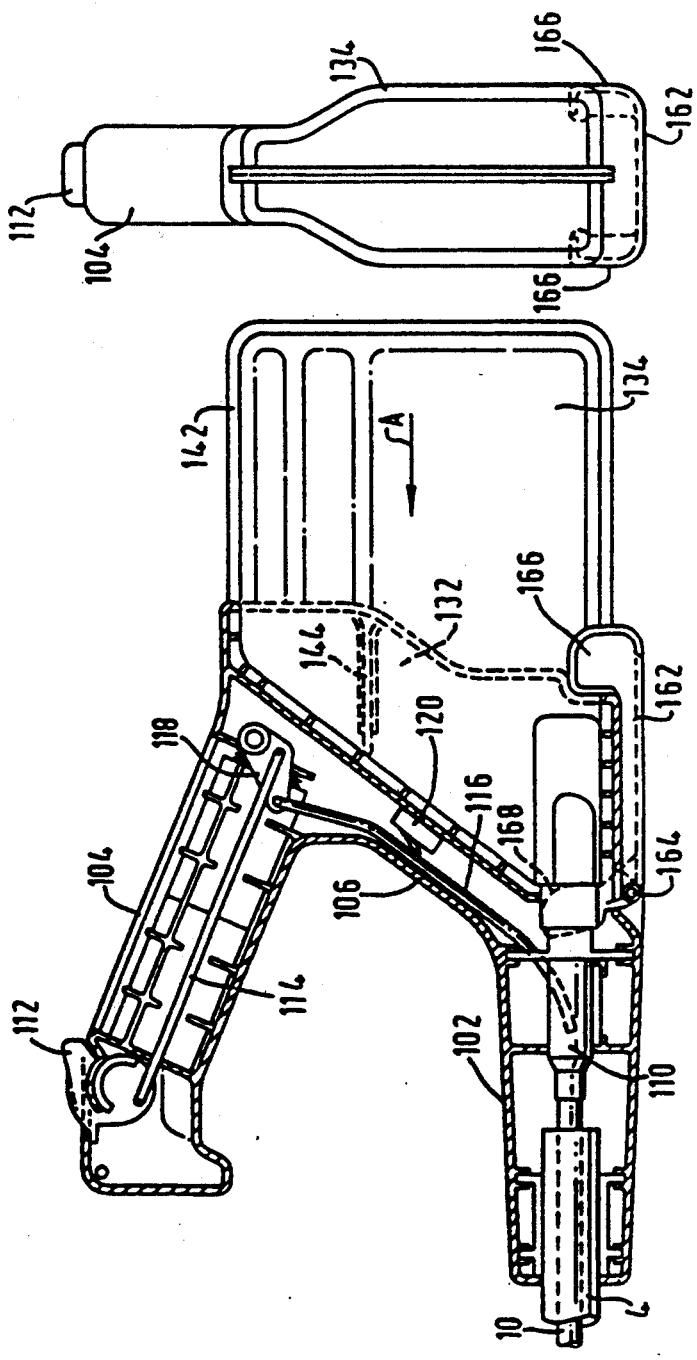

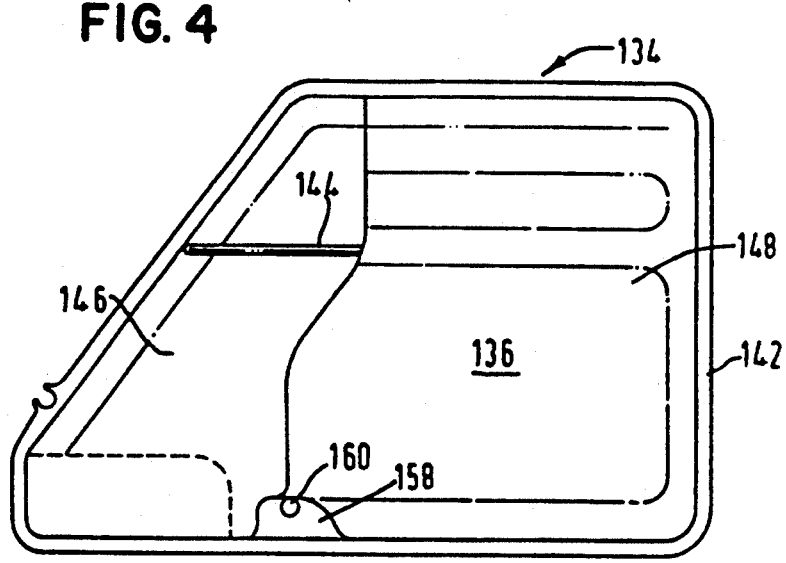
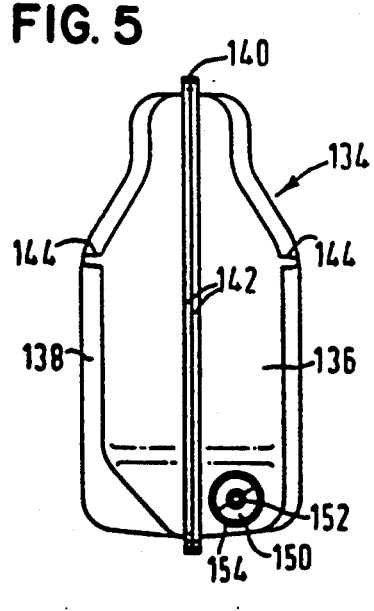
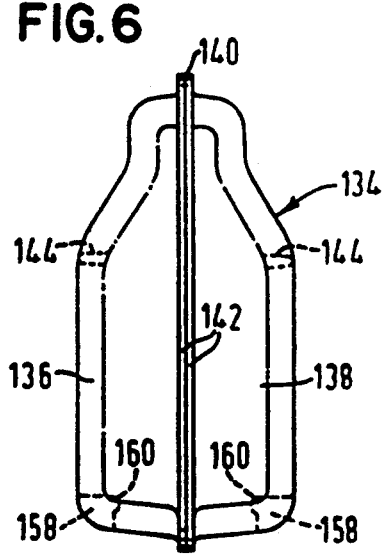

CONTAINER FOR A LIQUID FOR ATTACHMENT TO EQUIPMENT FOR DELIVERING THE LIQUID

This application is a continuation-in-part of U.S. patent application Ser. No. 07/221,284, filed Jul. 19, 1988 entitled "EQUIPMENT FOR DELIVERING FLUIDS", now U.S. Pat. No. 4,976,465.

This invention relates to a container for liquids, and is particularly, although not exclusively, concerned with herbicide containers for attachment to equipment for delivering the herbicide over the ground.

There exist hand-held lances for delivering herbicide which comprise a handset and a delivery device, in the form of a spraying head, which is connected to the handset by a tubular support. The handset is held by the operator, and the tubular support enables him to position the delivery device just above the ground to be treated.

It is conventional for the herbicide to be supplied to the lance from a container which may be supported over the shoulder of the operator or carried in a backpack. One form of known container is a collapsible bag, for example of plastics material, which is accommodated in a rigid casing, such as a cardboard box. Such containers are similar to those which are sometimes used for packaging wine. This, however, is a relatively expensive form of packaging, since it is necessary not only to form and fill the bags, but also to form the cardboard boxes and then to insert the filled bags into the boxes. It is also known for the container to be in the form of a bottle having a screwthreaded neck which is engagable with a correspondingly screwthreaded socket provided on the lance, a duct extending from the socket to the delivery device. However, this arrangement is somewhat clumsy to use, since the bottle must be presented to the lance without a cap, and cannot be connected to the lance with a rapid action. Instead, both the relatively unwieldy lance and the bottle must be held by the operator while the neck of the bottle is screwed fully home into the socket. There is consequently a serious danger that herbicide may be spilt during this operation. Such spillage is wasteful of a possibly expensive product, is hazardous to the operator, and may be destructive of plants on which it may unintentionally fall.

Hand-held lances of the types described above have so far been designed with professional users in mind. By "professional users" is meant local authorities and similar undertakings who need to treat relatively large areas of ground, using properly trained personnel. It is appropriate for such users to purchase the herbicide in relatively large quantities, for example in packages containing three liters. It would not make sense, however, for most domestic users to purchase herbicide in such large quantities when much smaller quantities, for example less than 0.5 liters, would be sufficient to treat the average-sized private garden. Furthermore, the dangers of spillage which are present with the second type of lance described above are even more likely to occur when the equipment is used by untrained amateurs.

According to the present invention there is provided a container of liquid, for attachment to equipment for delivering the liquid, the interior of which container is divided into two compartments by a flexible partition, one of which compartments contains the liquid and communicates with an outlet in the wall of the container, and the other of which compartments communicates with the surroundings through a vent hole provided in the wall of the container, the wall of the container being provided, at a region away from the outlet, with a recess for receiving a latching element for retaining the container with respect to the delivery equipment.

Preferably, the container is provided with guide means which serves to guide the container with respect to the handset of herbicide delivery equipment as the container is being inserted and withdrawn. This provision ensures reliable engagement between the outlet and the inlet fittings, which may be engagable with each other as a push fit.

Preferably, the flexible wall portion is of sufficient size and flexibility to be able to lie over substantially the entire internal surface of the wall of the container on one side of the flexible partition, so as to reduce the volume of the liquid-containing compartment substantially to nothing.

The wall of the container and the flexible partition may be made from compatible plastics materials, and may be secured to one another by welding.

For a better understanding of the present invention, and to show how it may be carried into effect, reference will now be made, by way of example, to the accompanying drawings, in which:

FIG. 1 is a sectioned side view of a handset of herbicide delivery equipment;

FIG. 3 is a rear view of the handset of FIGS. 1 and 2;

FIG. 4 is a side view of a container provided in the handset of FIGS. 1 to 3;

FIG. 5 is a front view of the container of FIG. 4; and

FIG. 6 is a rear view of the container shown in FIGS. 4 and 5.

Figure 2:
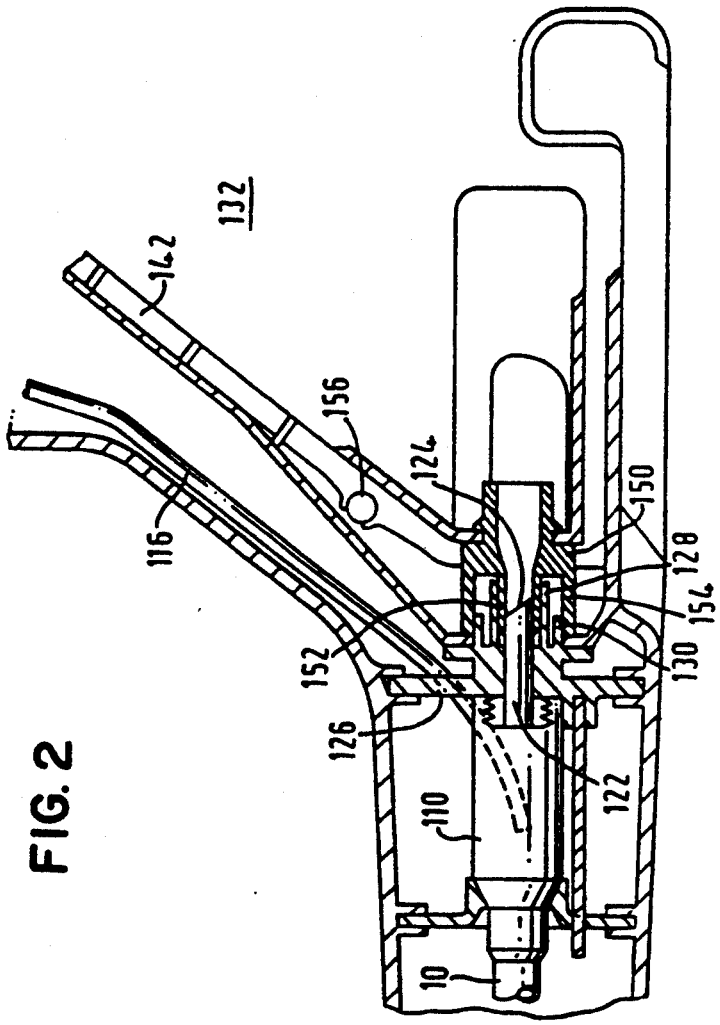
FIG. 2 is an enlarged fragmentary view of the handset of FIG. 1.

FIGS. 1 and 2 show a handset provided at one end of a support tube 4. A spraying head (not shown) is attached to the other end of the tube 4. A supply duct 10 extends through the tube 4 to convey herbicide, in use, from the handset to the spraying head.

The handset shown in FIG. 1 comprises a somewhat U-shaped body made up of a first limb 102, which receives the tube 4, a second limb 104, which constitutes a handle member, and a connecting portion 106. The duct 10 enters the limb 102 and is connected to the outlet of a valve 110. The valve 110 is operated from a control pivot 112, provided on the handle 104, through a linkage comprising two rods 114 and 116 which are operatively connected to each other by a rocker 118. A microswitch 120 is provided on a wall of the connecting portion 106, and is actuated by displacement of the rod 116 when the control pivot 112 is operated. Thus, for operation of the lance, the control pivot 112 serves both to open the valve 110, to cause herbicide to flow to the spraying head, and to actuate the switch 120, to supply power to a motor in the spraying head for rotating a distribution disc for ejecting the herbicide under centrifugal force. The power for this purpose is derived from batteries (not shown) accommodated in the handle 104.

As shown in FIG. 2, the inlet to the valve 110 comprises a short length of metal pipe 122 having an oblique end 124, the purpose of which will be discussed later in this description. The tube 122 is secured within a partition 126 which is mounted in a fixed position with respect to the handset. The valve 110 is also secured to this partition 126.

The partition 126 is provided with an inlet fitting for the valve 110 and consequently for the tube 10. This inlet fitting comprises a tubular socket 128 surrounded by a skirt 130. The tube 122 projects into the socket 128.

The socket 128 and the skirt 130 project into a cavity 132 provided in the handset. This cavity 132 is occupied by the forward portion of a container 134 of herbicide. The rearward part of the container 134 projects from the cavity 132, as shown in FIG. 1. The container is shown in greater detail in FIGS. 3 to 6. It comprises two casing halves 136 and 138 which adjoin one another at a seam 140. The two casing halves 136, 138 are substantially mirror images of one another, and so the container as a whole is generally symmetrical about the seam 140.

The housing parts 136 and 138 each have a peripheral lip 142, these lips meeting at the seam 140 to provide a peripheral flange extending around the container 134. Furthermore, lateral ribs 144 are provided in the forward portion of the container 146. This forward portion 146 is somewhat narrower than the rear portion 148, with &:he result that the rear portion 148 of the container is generally flush with the outer surface of the region of the handset defining the cavity 132.

A flexible partition extends between the casing halves 136 and 138, being secured to these casing halves at the seam 140. The interior of the container is thus divided into two compartments, one of which is defined between the flexible partition and the casing half 136, and the other of which is defined between the flexible partition and the casing half 138.

The casing half 136 is provided with an outlet fitting 150 which, as seen in FIG. 2, comprises a spigot 152 for engagement within the socket 128, and a collar 154 for engagement around the skirt 130. The tube 122 enters the spigot 152.

The casing half 138 is provided with a vent hole (not shown).

Although not shown in the drawings, the outlet fitting 150 is also provided with a stopper, connected by a flexible strap to the collar 154, for closing the spigot 152 when the container is removed from the cavity 132. A recess 156 may be provided in the flange 142 (see FIG. 2) for accommodating the stopper when the container is inserted into the recess 132.

The container has, on each side, a recess 158 which opens downwardly and outwardly. Each recess 158 has, on its inner surface, a dimple 160. As shown in FIGS. 3 to 6, the recesses 158 are formed in oppositely disposed, generally parallel wall regions, and open both outwardly and downwardly at a transverse wall region interconnecting the parallel wall regions.

As shown in FIGS. 1 and 2, the handset is provided with latching means in the form of a lever 162. This lever is freely pivoted, about a pivot axis 164, to the portion 102 of the handset. The lever 162 has latch elements 166, which, when the container 134 is inserted into the recess 132, engage within the recesses 158 to retain the container 134 within the recess 132. These latch elements 166 are provided with projections (not shown) which engage with a snap action in the dimples 160 to retain the lever 162 in the position shown in FIG. 1.

The lever 162 is provided with a cam 168 which is positioned within the handset. This cam 168 is movable, upon displacement of the lever 162, into and out of the cavity 132.

The internal walls of the cavity 132 are provided with formations, such as grooves (not shown) for cooperation with the flange 142 and the ribs 144 to guide the container into and out of the cavity 132.

For operation, the container 134 is inserted into the cavity 132 in the direction of the arrow A in FIG. 1. During the initial stage of this insertion movement, the lever 162 is pivoted downwardly, for example under its own weight, from the position shown in FIG. 1, with the result that the cam 168 projects into the cavity 132. The container 134 is guided into the cavity 132 by cooperation between the formations within the cavity 132 on the one hand, and the flange 142 and ribs 144 on the other hand. This guidance directs the outlet fitting 150 of the container onto the inlet fitting 128, 130 within the handset, so that the spigot 152 enters the socket 128. Similarly, the tube 122 enters the spigot 152, and, if the container is being used for the first time, the oblique end face 124 of the tube 122 serves to cut through a partition provided within the spigot 152, to enable flow from the container, through the valve 110 (when opened), into the tube 10.

During the final stage of the movement of the container into the cavity 132, the forward end of the container engages the cam 168, and further displacement of the container 134 causes the lever to be displaced into the position shown in FIG. 1, in which the latch elements 166 engage in the recesses 158, the projections on these latch elements 166 snapping into the dimples 160, in order to retain the lever 162 in the engaged position. The final engagement of the latch elements 166 with the recesses 158 and the container 134 may be accomplished by pushing the container firmly inwardly of the cavity 132 in the direction of the arrow A. The proper engagement of the latch elements 166 with the container 134 provides a visual indication that the container is properly seated within the cavity 132, with the outlet fitting 150 cooperating properly with the inlet fitting 128, 130 of the tube 10.

The equipment may then be used by an operator, who grasps the handle 104 with one hand and manipulates the control pivot 112 with the thumb of that hand both to open the valve 110 and to actuate the switch 120. It will be appreciated that the centre of gravity of the container 134, whether it is full or empty, is behind the handle 104 and so counterbalances the weight of the tube 4 and the spraying head. This feature makes the lance less tiring to use for long periods.

At the end of a spraying operation, the container 134 can be removed from the cavity 132 by grasping the lever 162 and pulling it manually downwardly from the position shown in FIG. 1. This releases the latch elements 166 from the recesses 158 and, at the same time, causes the cam 168 to push the container 134 out of the cavity 132, disengaging the outlet fitting 150 from the inlet fitting 128, 130. The spigot 152 can then be closed by means of the stopper previously retained in the recess 156.

It will be appreciated that the system described above enables containers of herbicide, or other fluid such as cleaner, to be rapidly and safely connected to, and disconnected from, the handset with minimal risk of spillage or leakage.

It will also be appreciated that, although, in the embodiments of the present invention which have been described with reference to the drawings, the container has been shown within the handset, it would be possible for the container to be fitted at other locations on the delivery equipment, for example on the spraying head.

We claim:

1. A container of liquid adapted for attachment to equipment for delivering the liquid, the container comprising:

a hollow container body defining the interior of the container, the body having oppositely disposed side walls and oppositely disposed end walls;

a flexible partition which divides the interior of the container into first and second compartments, the first compartment containing the liquid;

an outlet provided in one end wall, for providing communication between the first compartment and the exterior of the container;

a vent hole provided in the container body and providing communication between the second compartment and the exterior of the container;

a recess provided in at least one of the side walls at a position between the ends walls; and an elongate guide track provided on the container body and extending in a direction between the end walls, for guiding the container with respect to the equipment during attachment of the container to the equipment.

2. A container as claimed in claim 1, in which the recess is one of two recesses provided one in each side wall of the container.

3. A container as claimed in claim 1, in which the elongate guide track further comprises a plurality of parallel ribs.

4. A container as recited in claim 1, in which the container body has a first region in which the outlet is situated, and a second region, the first region being narrower than the second region.

5. A container as claimed in claim 1, in which the container body comprises two components, between which the flexible partition is secured.

6. A container as claimed in claim 5, in which the two components are substantially symmetrical with respect to each other about the plane at which they meet.

7. A container of liquid adapted for attachment to equipment for delivering the liquid, the container comprising:

a hollow container body defining the interior of the container, the body having oppositely disposed side walls, a transverse wall and oppositely disposed end walls, the side walls having two substantially parallel wall portions, the parallel wall portions being interconnected by the transverse wall;

a flexible partition which divides the interior of the container into first and second compartments, the first compartment containing the liquid;

an outlet provided in one end wall, for providing communication between the first compartment and the exterior of the container;

a vent hole provided in the container body and providing communication between the second compartment and the exterior of the container;

a recess provided in at least one of the side walls at a position between the end walls and within the parallel wall portions, the recess opening at the transverse wall portion; and an elongate guide track provided on the container body and extending in a direction between the end walls, for guiding the container with respect to the equipment during attachment of the container to the equipment.

8. A container as claimed in claim 7, in which the recess is one of two recesses provided one in each side wall of the container.

9. A container as claimed in claim 7, in which the elongate guide track further comprises a plurality of parallel ribs.

10. A container as recited in claim 7, in which the container body has a first region in which the outlet is situated, and a second region, the first region being narrower than the second region.

11. A container as claimed in claim 7, in which the container comprises two components, between which the flexible partition is secured.

12. A container as claimed in claim 11, in which the two components are substantially symmetrical with respect to each other about the plane at which they meet.

* * * * *

UNITED STATES PATENT AND TRADEMARK OFFICE
CERTIFICATE OF CORRECTION

PATENT NO.  : 5,135,171
DATED       : August 4, 1992
INVENTOR(S) : Gill et al

It is certified that error appears in the above-identified patent and that said Letters Patent is hereby corrected as shown below:

Column 3, line 22, "&:he" should be --the--

Signed and Sealed this

Fifteenth Day of February, 1994

Attest:

BRUCE LEHMAN

*Attesting Officer*   *Commissioner of Patents and Trademarks*